Patented July 2, 1946

2,403,077

UNITED STATES PATENT OFFICE 2,403,077

LAMINATED STRUCTURE AND METHOD

Albert Hershberger, Kenmore, N. Y., assignor to E. I. du Pont de Nemours & Company, Wilmington, Del., a corporation of Delaware No Drawing. Application February 6, 1942, Serial No. 429,835

10 Claims. (Cl. 117—75)

This invention relates to metals protected with a coating of polymeric vinyl material, and more particularly it relates to light metals coated with a polymeric vinyl material such as polyvinyl acetals, polyvinyl acetate, polyvinyl chloride, etc., and to an improved method for obtaining strong adhesion between the light metal and such coating.

Light metals such as aluminum, magnesium and alloys containing these metals are widely employed in the industrial arts and especially in the large-scale construction of airplanes, automobiles, and like structures. It is well known, however, that these metals suffer from the disadvantage of being easily attacked mechanically and chemically so that to inhibit breakdown and deterioration and to maintain them in a serviceable condition for long periods of time it has been found desirable and in some cases necessary to provide such metals with a protective coating. By reason of their chemical stability, toughness, flexibility, etc., polymeric vinyl plastic materials such as polyvinyl acetal, polyvinyl acetate, and the like immediately suggest themselves. However, the polymeric vinyl compounds are not self-bonding to metal, and the lack of a suitable adhesive for bonding these plastic compounds to metal has constituted a serious obstacle to their wide use either as protective coatings or for fabricating plastic to metal structures.

It is, therefore, an object of this invention to provide an improved method of joining polyvinyl compounds to metals. Another object of this invention is to provide a superior protective coating on light metals and light metal alloys. Other objects will appear from the description that follows.

The objects of this invention are accomplished by first applying to a base metal or metal alloy a polyvinyl compound dissolved in an organic solvent together with thermo-setting resin-forming ingredients comprising a polyhydric phenol, an aldehyde, and a polymerization catalyst, causing the resin-forming ingredients to react to form a substantially insoluble infusible resin whereby to form an adhesive layer of resin and polyvinyl compound, and applying thereover a polyvinyl compound under such conditions that it is welded with the polyvinyl compound of the adhesive layer.

As polyvinyl compounds eminently suited as protective coatings for aluminum and other light metals or light metal alloys, the following, all of which are polymers of monovinyl compounds, are mentioned: polyvinyl acetals or mixed acetals such as polyvinyl formal, polyvinyl propional, polyvinyl butyral, polyvinyl isobutyral, polyvinyl benzal formal, etc.; polyvinyl acetate, polyvinyl chloride, polyvinyl chloracetate, styrene, etc., any of which may be used alone or in combination.

As the thermo-setting resin-forming ingredients of the adhesive, the polyhydric phenols and aldehydes, both of which are soluble to the extent of 1 to 10% or more in the organic solvent from which the adhesive is applied to the metals, are preferred. The resins should be capable of polymerizing rapidly and completely to a substantially insoluble, infusible form at temperatures of about 125° C. or less. The polyhydric phenols having the hydroxyl groups in the benzene nucleus meta with respect to one another such as resorcinol, phloroglucinol and orcinol are preferred. As the aldehyde member of the resin-forming ingredients, formaldehyde, para-formaldehyde, acetaldehyde, furfural and aldol have all been found to be quite satisfactory. Preferably the aldehyde is used in some excess of that theoretically required to react with all the phenol present in order to insure polymerization of all the phenol. The polyhydric phenol-aldehyde resin may be used in concentrations between 5 and 75% of the total weight of the solvent-free adhesive layer although preferably the concentration of this thermo-setting resin should be within the range of 30 to 60%.

A basic catalyst, to promote polymerization of the resin-forming ingredients such as NaOH, KOH, etc., in concentrations of from 0.5 to 1% by weight on the basis of the resin-forming materials is preferred.

The base material to which these polyvinyl compounds may be adhered include any metal or metal alloy such as zinc, nickel, chromium, copper, brass, iron, steel, stainless steel, Dow metal, lead, etc. The light metals such as aluminum and magnesium and alloys of these metals, however, form the class of base materials to which the polyvinyl compounds of this invention are particularly applicable.

The adhesive consisting of a polyvinyl compound and the resin-forming ingredients dissolved in a suitable organic solvent may be applied to the metal or metal alloy by spraying, by brushing, by doctoring, or by any other suitable means, and the solvent evaporated at room temperature or at an elevated temperature. At some stage in the drying process or subsequent to drying, it is preferred that the temperature be raised to 65° C. or higher for a short time to insure polymerization of the resin-forming material to a substantially insoluble, infusible form.

The polyvinyl compound to be adhered to the metal is then applied to the adhesive-coated metal under such conditions that it is intimately united or welded to the polyvinyl compound in the adhesive layer. For instance, the polyvinyl compound may be applied from a suitable solution in an organic solvent which is also a solvent for the polyvinyl compound in the adhesive, by any suitable means such as by brushing, spraying or doctoring, after which the solvent is evaporated either at normal or at an elevated temperature. Also, a polyvinyl material in the form of a sheet may be applied or laminated to the adhesive-coated metal by heat and pressure, for example, by means of a hot roll. Should the polyvinyl material be in the form of a powder, it may be heat rolled, heat pressed, or heat molded onto the adhesive-coated metal.

The following example further illustrates the invention. Parts are by weight.

*Example*

An adhesive for bonding to aluminum polyvinyl butyral prepared by combining about 90% of the hydroxyl groups of polyvinyl alcohol with butyraldehyde is prepared as follows: 15 parts of resorcinol, 31 parts of 37% formaldehyde, 0.3 part of NaOH and 15 parts of polyvinyl butyral prepared as immediately described above are dissolved in 189 parts of ethyl alcohol, and this composition is applied to a previously cleaned aluminum sheet and the solvent evaporated at a temperature of 65° C. A top coat of 15 parts of polyvinyl butyral prepared as described above, dissolved in 85 parts of ethyl alcohol, is then applied and the solvent evaporated at temperatures of 65° C.

This coating adheres to the aluminum tenaciously and even after immersion in water can only be separated from the aluminum with extreme difficulty. The coated aluminum sheet, furthermore, can be bent or flexed without causing breaking or separation of the coating from the base.

The adhesive may also in itself constitute a protective coating without a top coat of the polyvinyl compound. For this purpose, it is preferred to have a somewhat lower ratio of thermo-setting resin-forming materials to the polyvinyl material in the coating, than is the case when the coating is utilized as an adhesive.

The composite or laminated metal structures made in accordance with this invention possess certain desirable properties that have not heretofore been obtained. Adhesion between the metal and the polyvinyl compound is tenaciously retained even upon long immersion in water. The application of polyvinyl compounds to light metals or light metal alloys such as aluminum is especially noteworthy for in the wide field of use of such metals no satisfactory solution of this type of adhesion problem has heretofore been obtained. It frequently happens that these light metals are desired in very thin flexible form and it has been found that bending and flexing of such thin structures protected in accordance with this invention will not cause separation of the coating from the metal even though subjected to a wide range of temperatures. This invention makes it possible to laminate, mold or coat numerous polyvinyl compounds to a wide variety of metals, metal alloys and obtain a joint of satisfactory strength under all sorts of adverse conditions. Furthermore, the preparation of the coated or laminated structures is simple and no very high temperature or long period of baking is required to set up the resin in the adhesive.

It is to be understood, of course, that the invention is not limited to the exact materials and conditions described but comprehends rather all obvious substitutes, equivalents, and variations falling within the spirit and terms of the invention defined in the following claims.

I claim:

1. A method for providing metal surfaces with a protective layer of polyvinyl compound which comprises first applying to the metal surface a liquid composition consisting of (a) a polymer of a monovinyl compound, (b) thermo-setting resin ingredients comprising a polyhydric phenol, an aldehyde, and a polymerization catalyst, and (c) an organic solvent for constituents (a) and (b), causing said resin ingredients to react to form a substantially insoluble, infusible resin whereby to form an adhesive base coat on said metal surface, and finally associating a layer comprising essentially a polymer of a monovinyl compound with said base coat.

2. A method of providing light metal-containing surfaces with a protective coating of polymerized vinyl compound which comprises first applying to the metal a liquid composition consisting of (a) a polymer of a monovinyl compound, (b) thermo-setting resin-forming ingredients comprising a polyhydric phenol, an aldehyde, and a polymerization catalyst, and (c) an organic solvent for constituents (a) and (b), removing said solvent, polymerizing said resin-forming ingredients at a temperature of at least 65° C. to form a substantially insoluble, infusible resin whereby to form an adhesive base coat on the surface of the light metal, and finally adhering to said base coat a coating comprising essentially a polymer of a monovinyl compound.

3. A method of providing aluminum-containing surfaces with a protective coating of polyvinyl compound which comprises coating the metal surface with a liquid composition consisting of (a) a polymer of a monovinyl compound, (b) thermo-setting resin-forming ingredients comprising a polyhydric phenol having the hydroxyl groups on the benzene nucleus meta with respect to one another, an aldehyde and a polymerization catalyst, and (c) an organic solvent for (a) and (b), drying the coating to remove the solvent and reacting the resin-forming ingredients at a temperature of at least 65° C. to form a substantially insoluble, infusible resin, whereby to form an adhesive base coat on the metal surface, and finally applying to said base coat a coating comprising essentially a polymer of a monovinyl compound dissolved in an organic solvent.

4. The method according to claim 2 wherein the polyhydric phenol and aldehyde comprise 30 to 60% by weight based on the solvent-free weight of the composition first applied, and wherein the amount of aldehyde is slightly in excess of that required to react with all of the polyhydric phenol.

5. The method according to claim 3 wherein the polyhydric phenol and aldehyde comprise from 30 to 60% by weight based on the solvent-free weight of the composition first applied, and wherein the amount of aldehyde is slightly in excess of that required to react with all of the polyhydric phenol.

6. As an article of manufacture a metal having a protective coating comprising essentially a polymer of a monovinyl compound, and interposed between the metal and said protective coating a layer consisting of a polymer of a monovinyl compound and a substantially insoluble, infusible resin formed in situ from a polyhydric phenol and an aldehyde.

7. As an article of manufacture a metal comprising essentially a light metal and having a protective coating comprising essentially a polymer of a monovinyl compound, and interposed between the metal and said protective coating a layer consisting of a polymer of a monovinyl compound and a substantially insoluble, infusible resin formed in situ by the reaction of a polyhydric phenol and an aldehyde.

8. As an article of manufacture a light metal comprising essentially aluminum and having a protective coating comprising essentially a polymer of a monovinyl compound, and interposed between the metal and said protective coating a layer consisting of a polymer of a monovinyl compound and a substantially insoluble, infusible resin formed in situ by the reaction of a polyhydric phenol and an aldehyde.

9. A method for providing metal surfaces with a protective layer of polyvinyl butyral which comprises first applying to the metal surface a liquid composition consisting of (a) a polyvinyl butyral, (b) thermo-setting resin ingredients comprising resorcinol formaldehyde and a polymerization catalyst, and (c) an organic solvent for constituents (a) and (b), causing said resin ingredients to react to form a substantially insoluble, infusible resin whereby to form an adhesive base coat on said metal surface, and finally associating a layer comprising essentially a polyvinyl butyral with said base coat.

10. As an article of manufacture a metal having a protective coating comprising essentially a polyvinyl butyral, and interposed between the metal and said protective coating a layer consisting of a polyvinyl butyral and a substantially insoluble, infusible resin formed in situ from resorcinal and formaldehyde.

ALBERT HERSHBERGER.